United States Patent [19]

Duncanson et al.

[11] Patent Number: 4,884,269

[45] Date of Patent: Nov. 28, 1989

[54] METHOD AND APPARATUS FOR CONNECTING ISDN DEVICES OVER AN ANALOG TELEPHONE LINE

[75] Inventors: Jay P. Duncanson, San Francisco; Stephen J. Speckenbach, Oakland, both of Calif.

[73] Assignee: Hayes Microcomputer Products, Inc., Norcross, Ga.

[21] Appl. No.: 209,348

[22] Filed: Jun. 20, 1988

[51] Int. Cl.⁴ .............................. H04J 3/12; H04J 3/17
[52] U.S. Cl. .................................. 370/110.1; 370/94.1; 370/80; 375/8; 375/121
[58] Field of Search ................... 370/24, 93, 94, 60, 370/110.1, 79, 95, 81, 80; 375/8, 121; 379/93

[56] References Cited

U.S. PATENT DOCUMENTS

| | | | |
|---|---|---|---|
| 4,637,012 | 1/1987 | Crabbe, Jr. | 370/24 |
| 4,663,754 | 5/1987 | Senoo | 370/110.1 |
| 4,672,603 | 6/1987 | Conforti | 370/110.1 |
| 4,700,358 | 10/1987 | Duncanson et al. | 379/93 |

Primary Examiner—Robert L. Griffin
Assistant Examiner—Wellington Chin
Attorney, Agent, or Firm—Jones, Askew & Lunsford

[57] ABSTRACT

A method and apparatus for allowing ISDN devices to communicate over an analog telephone line is shown. A first interface (12) accepts ISDN formatted data from an ISDN terminal equipment (TE) device (10), removes the D channel data from the ISDN data, and provides the D channel data to a synchronous modem (14). The modem (14) places onto an analog telephone line (15) a modulated carrier corresponding to the D channel data. The modulated carrier is passed through a telephone switch (16)onto another analog telephone line (17). A second synchronous modem (20) accepts the modulated carrier, demodulates the modulated carrier to recover the data, and provides the data to a second interface (22). The second interface (22) accepts the data from the modem (20), inserts the data into the D channel information in ISDN data stream, and provides the ISDN data stream to an ISDN network termination (NT) device or ISDN switch (24). The result is that two ISDN devices can communicate with each other, even in areas where the local telephone company does not provide ISDN capability and the two devices must communicate with each other using a non-ISDN medium, such as an analog telephone line. Furthermore, an ISDN device can be tested and evaluated for compatibility and operation with ISDN switch without the necessity of having to transport the ISDN device to an area wherein the local telephone company provides ISDN switching capabilities.

17 Claims, 11 Drawing Sheets

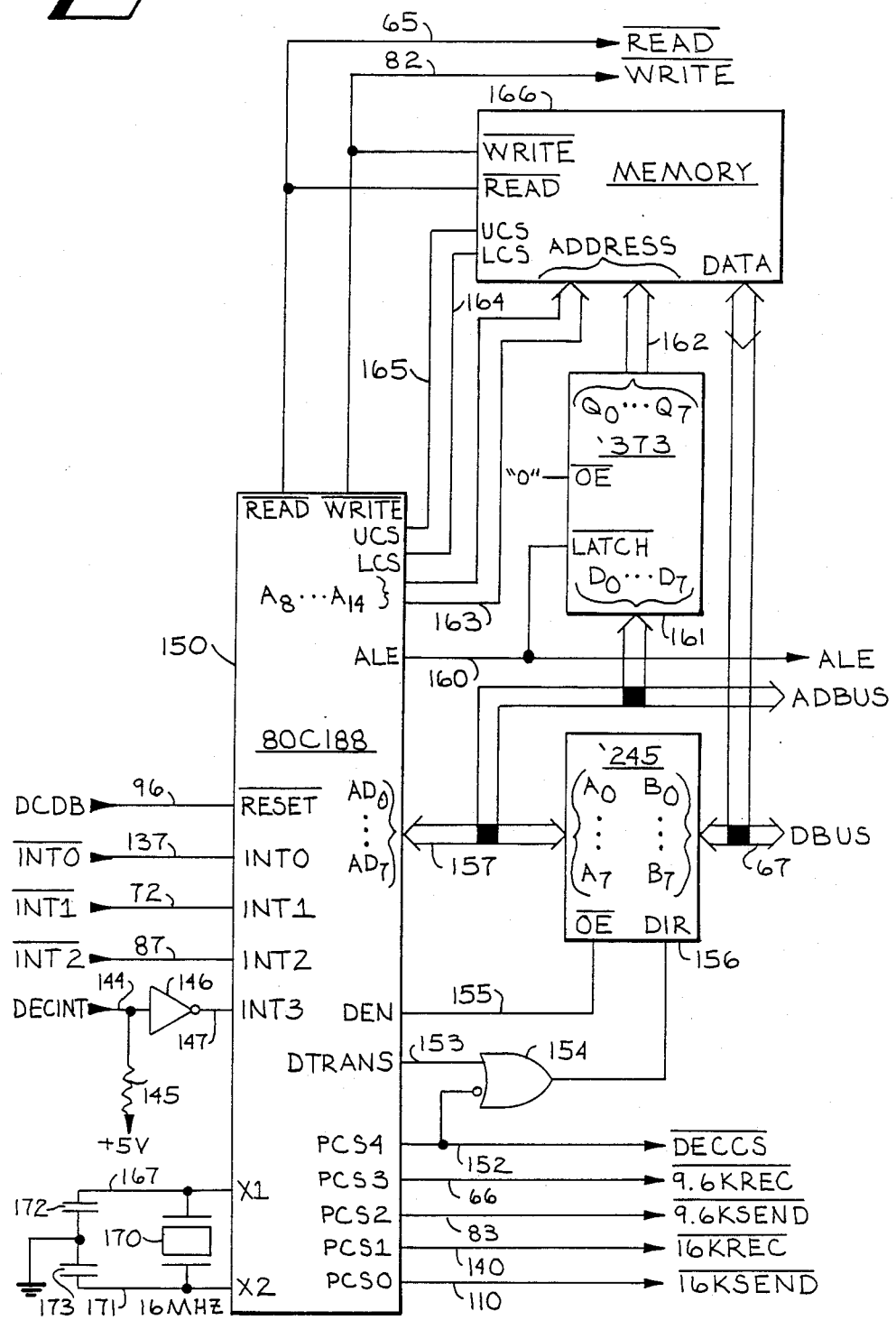
Fig-3B1

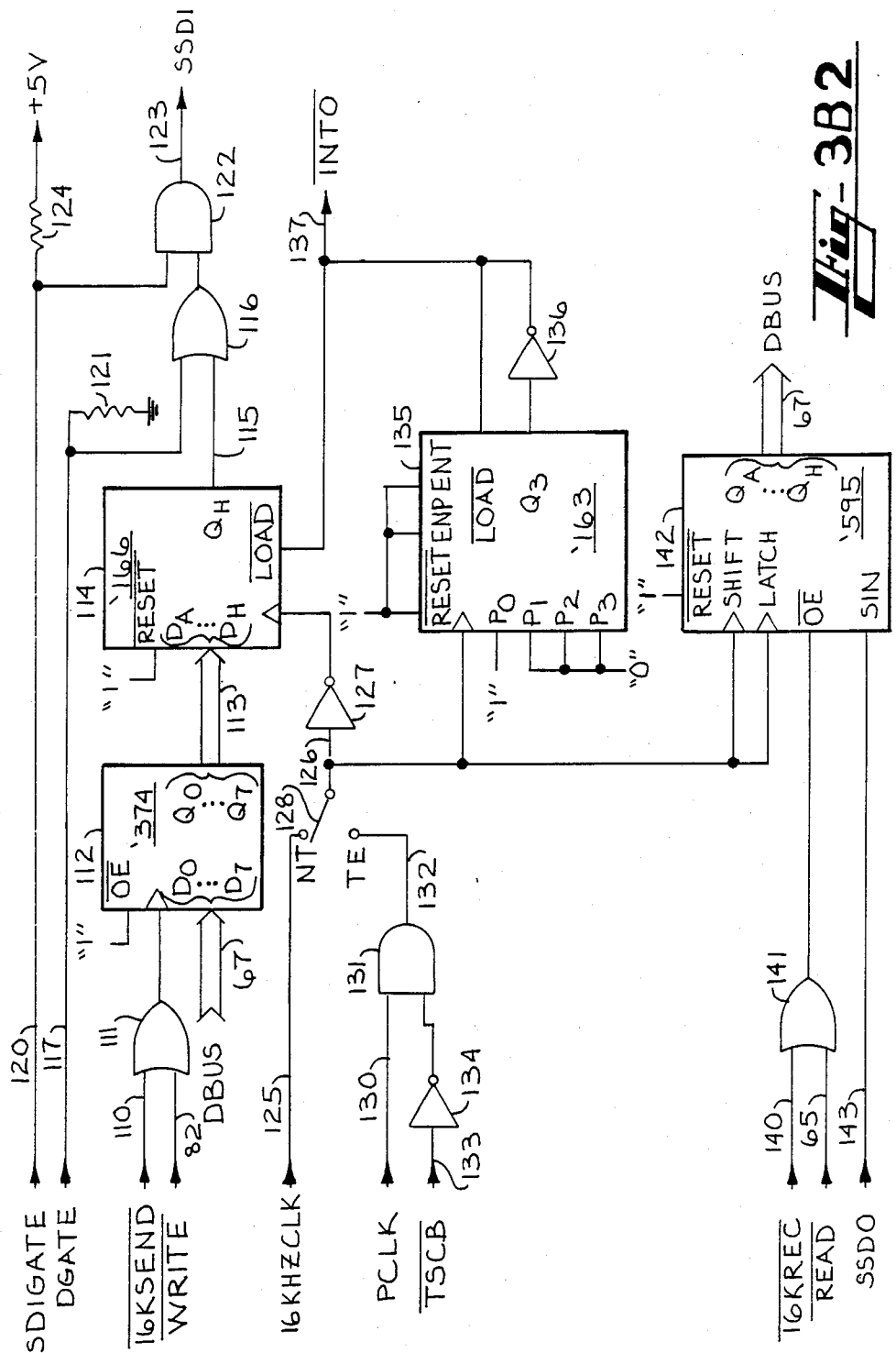
Fig-3B2

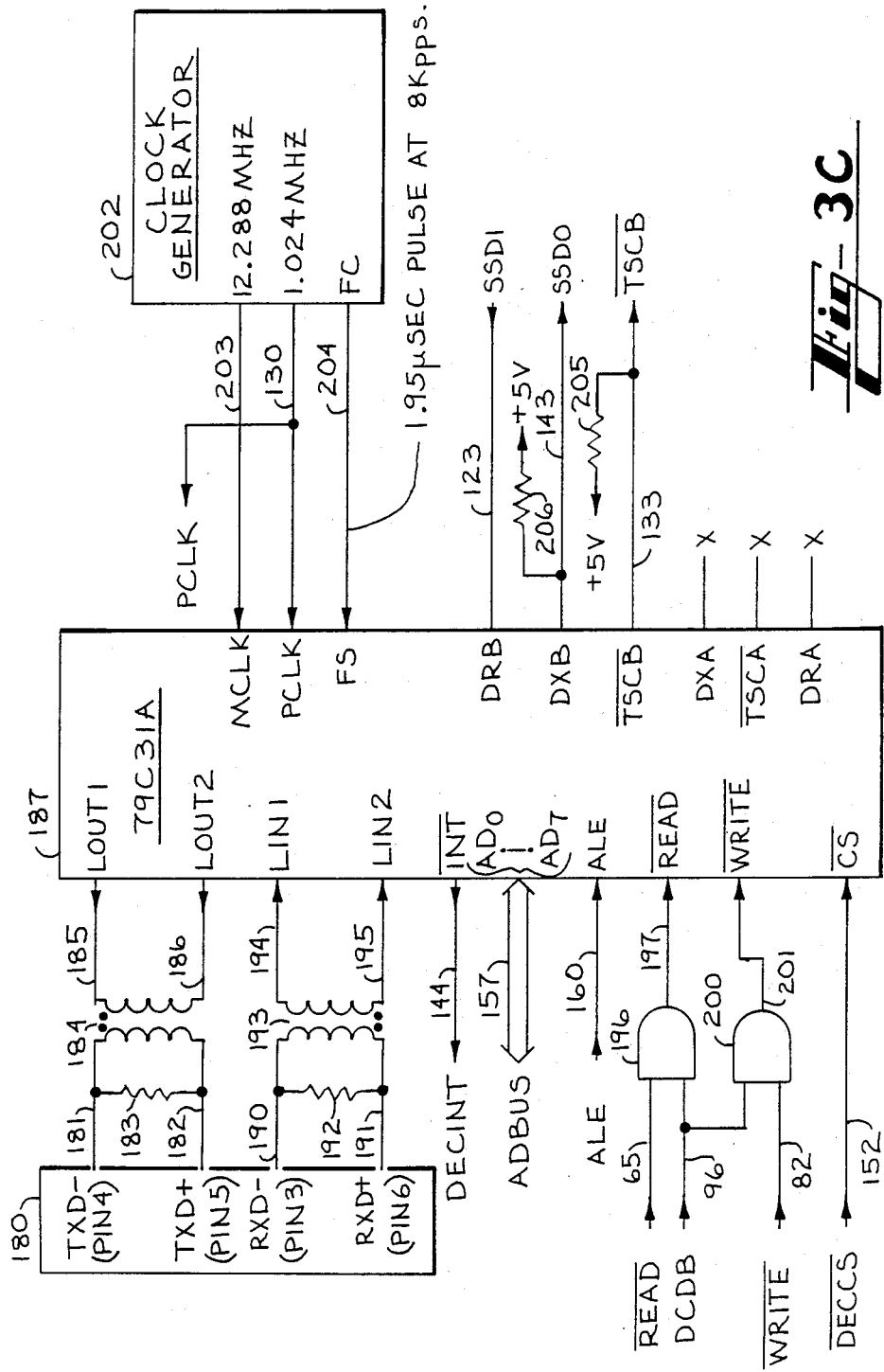

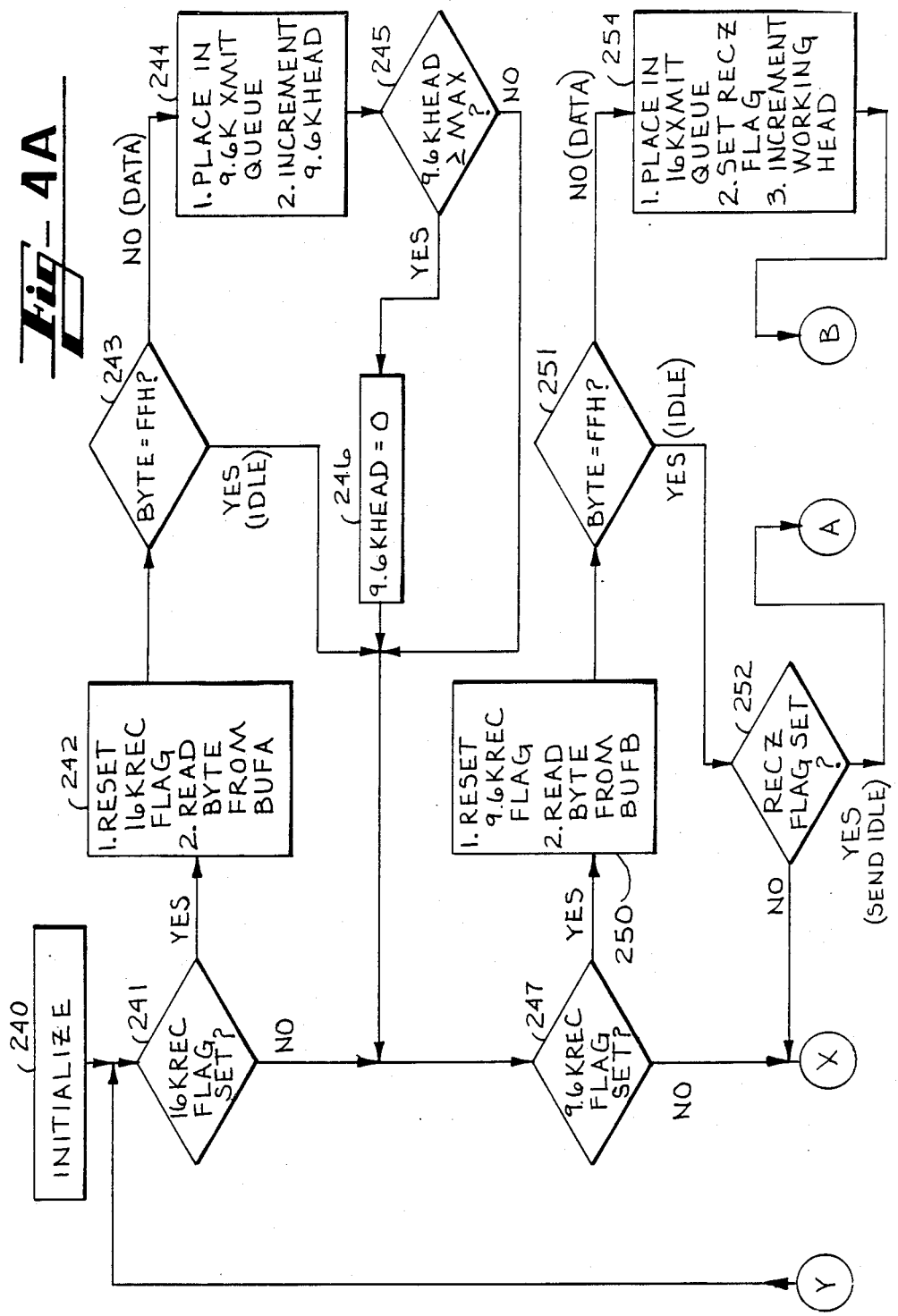

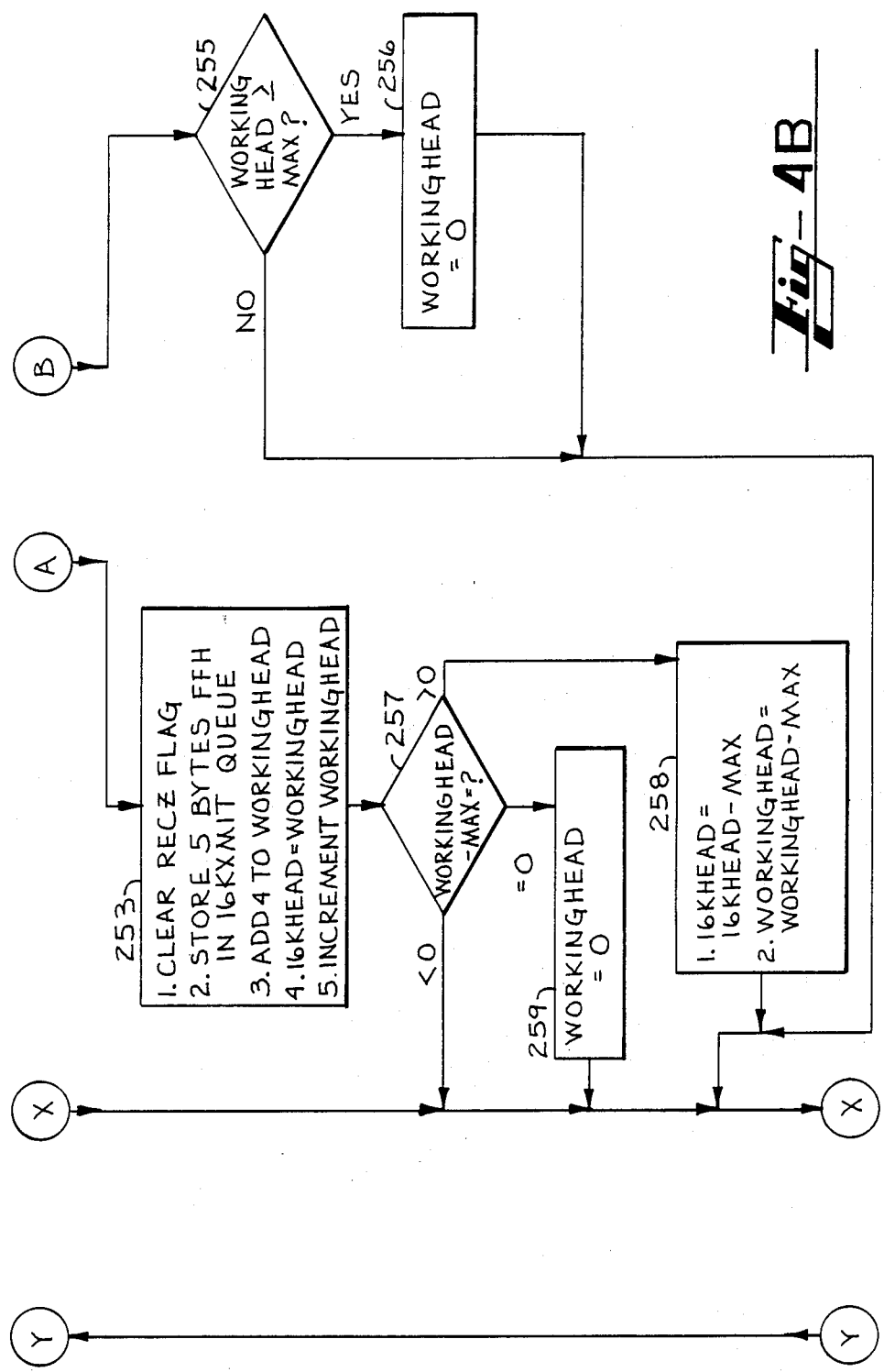

METHOD AND APPARATUS FOR CONNECTING ISDN DEVICES OVER AN ANALOG TELEPHONE LINE

TECHNICAL FIELD

The present invention relates to data communications and interface devices and, more particularly, to interfaces for permitting the connection and testing of ISDN devices in a non-ISDN environment.

BACKGROUND OF THE INVENTION

The Integrated Services Digital Network (ISDN) is a digital switching and network architecture which provides end-to-end digital signal connectivity and uses an out-of-band signaling capability. The end-to-end digital connectivity allows signals to enter the network in digital form, be transported in digital form, and be delivered to the user in digital form. This feature of ISDN can, in some circumstances, eliminate the need for a modem which converts the digital signals into analog form for transmission over an analog telephone network. The out-of-band signaling feature allows the signaling information required to administer a communications function (callsetup and take down, call monitoring, call waiting tones, etc.) to be transmitted to the central office switch by a separate signaling channel. This out-of-band signaling can therefore eliminate the need to use channel space in a talk path for administrative purposes. In an ISDN network, all signals, whether voice, data, or administrative, are transferred in digital form. Two types of ISDN communications channels are provided to the ISDN user. These are known as B channels and D channels. The D channel contains signaling and/or data information and the B channel contains voice or data information. The B and D channels are multiplexed to form a single bit stream containing user information (voice and data) and user control (signaling). Both B and D channels are bi-directional.

At present, the telephone companies provide ISDN facilities only in limited areas of a few major cities. A person wishing to test and/or evaluate ISDN hardware and/or software must therefore take the hardware and/or software to an area in a city in which the local telephone company provides ISDN services. This procedure is costly, time consuming and ineffective since, each time the hardware and/or software is modified another trip must be made to evaluate whether the modification has corrected the previously existing problem and to ascertain that new problems have not been created.

Therefore, there is a need for a method and an apparatus which will allow a person developing ISDN compatible equipment to gain access to an ISDN network without having to travel to a city where ISDN services are available.

The lack of ISDN capability in most areas of the country also presents a problem for a potential purchaser of an ISDN-compatible device. The ISDN-compatible device may have all the features desired and/or required by the potential purchaser except for one: the device cannot operate over a conventional analog telephone line. If the potential purchaser is not in an area where ISDN services are provided by the local telephone company the potential purchaser will not be able to use the desired device.

Therefore, there is a need for a method and an apparatus which will allow an ISDN compatible device to communicate with another ISDN device over a standard analog telephone network.

SUMMARY OF THE INVENTION

Briefly described, the present invention is a device which allows an ISDN compatible device to access an ISDN telephone network by using a conventional analog telephone line.

Also briefly described, the present invention is a device which allows an ISDN compatible device to communicate with another ISDN compatible device by using a conventional analog telephone line.

More particularly described, the present invention is an ISDN/RS-232 interface and protocol converter.

Also more particularly described, the present invention is a device which can selectably function as either a network termination (NT) device or a terminal equipment (TE) device in an ISDN system or network.

An ISDN compatible device must generally be either a NT device or a TE device. NT devices can only communicate with TE devices, and vice versa. This limitation is a characteristic of the ISDN protocol. The telephone office switching system is an NT device and therefore a user's ISDN compatible equipment will be a TE device.

In order to allow one ISDN device to communicate with another ISDN device over a non-ISDN network, such as a conventional analog telephone line network, two interfaces must be provided. The first interface must provide a link between the TE device and the analog network and the second interface must provide a link between the NT device and the analog network. Because of the TE/NT communication requirement, mentioned above, the TE interface, which interfaces between the TE equipment and the telephone line, must appear as an NT device. Similarly, the NT interface, which interfaces with the NT device, must appear as a TE device.

Regardless of whether it is functioning as an NT interface or a TE interface, the present invention accepts the ISDN serial data stream, extracts the D channel data, buffers the extracted data and, via a synchronous modem, places the data on an analog telephone line as a modulated carrier for transmission to a desired destination. Similarly, via the synchronous modem, the present invention receives the modulated carrier from the analog telephone line, demodulates the carrier to recover the data, buffers the data, and inserts the data as D channel data in an ISDN data stream.

The ISDN D channel transfers data at the rate of 16 kbps. However, modems do not generally transfer data at 16 kbps but generally transfer data at 9.6 kbps or a slower speed. Since these two speeds are different the present invention also provides a data buffer to compensate for the different transmission speeds. The D channel data is accepted at the 16 kbps rate, written into a memory at the 16 kbps rate, read from the memory at the modem rate, and transmitted over the analog telephone line at the modem rate. Buffer overflow is prevented through the packetizing of data and the use of flow control protocols between the TE device and the NT device. The packetizing of data causes large non-data spaces to occur on the data line thereby reducing greatly the average data rate. The TE and NT devices do not buffer the non-data spaces.

A single device can selectably function either as an NT interface or a TE interface. Selection of the NT or TE function is accomplished by inserting or removing certain integrated circuits. Selection may also be accomplished by a switch which enables or disables certain of the integrated circuits. This feature allows a single device to serve as either the NT or TE interface so that the device may be used with whatever type ISDN equipment is at the user's site.

Therefore, it is an object of the present invention to allow an ISDN compatible device to access an ISDN telephone network by using a conventional analog telephone line.

It is another object of the present invention to allow an ISDN compatible device to communicate with another ISDN compatible device by using a conventional analog telephone line.

It is another object of the present invention to provide an ISDN/RS-232 interface and protocol converter.

It is a further object of the present invention to provide a device which can selectably function as either an NT device or a TE device in an ISDN system or network.

That the present invention accomplishes these and other objects will be apparent from the detailed description and drawing.

BRIEF DESCRIPTION OF THE DRAWING

FIGS. 3A through 3D are a schematic diagram of the preferred embodiment of the interface circuit.

FIGS. 4A through 4D are a flow chart of the operation of the preferred embodiment.

DETAILED DESCRIPTION

Figure 1:
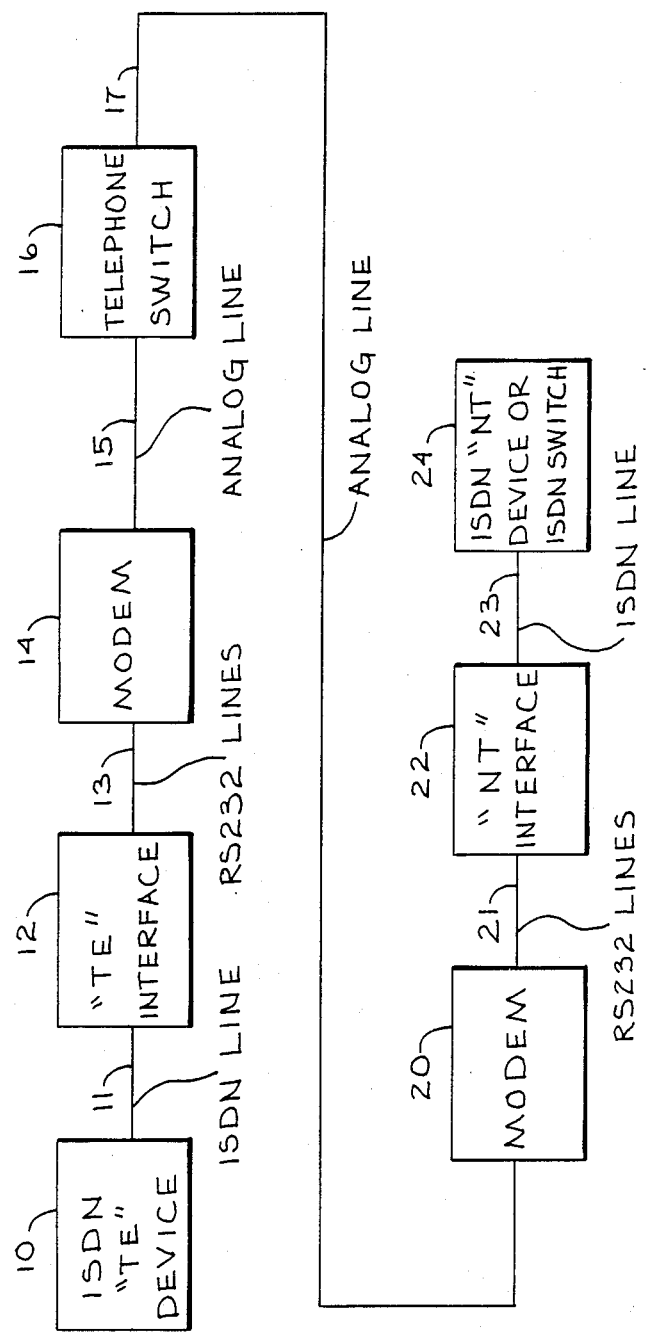
FIG. 1 is a block diagram of the preferred embodiment of the present invention in its preferred environment.

Turning now to the drawing in which like numerals represent like components throughout the several figures, the preferred embodiment of the present invention will be described.

FIG. 1 is a block diagram of the preferred embodiment of the present invention in its preferred environment. An ISDN compatible device 10, such as a terminal equipment ("TE") ISDN device, is communicating with an ISDN network termination ("NT") device or an ISDN switch 24 through a telephone switch 16 and analog telephone lines 15 and 17. Telephone switch 16 may be an analog switch or a digital switch. Both devices 10 and 24 transmit and receive digital signals on ISDN buses 11 and 23, respectively, and, it will be appreciated, cannot directly link up because of the analog lines 15 and 17 and, if it is an analog switch, switch 16. TE interface 12 and modem 14, which are connected between ISDN device 10 and analog telephone line 15 convert the digital signals from ISDN device 10 into analog signals suitable for transmission through analog switch 16 and over analog telephone line 15. Similarly, NT interface 22 and modem 20, which are connected between ISDN device/switch 24 and analog telephone line 17, convert the digital signals from ISDN device/switch 24 into analog signals for provision to switch 16 over analog telephone line 17. Devices 12, 14, 20 and 22 are bidirectional and also convert analog signals on telephone lines 15 and 17 into digital signals on lines 11 and 23, respectively, for use by ISDN devices 10 and 24, respectively. In the preferred embodiment, modems 14 and 20 convert analog signals into digital signals, and vice versa. Interfaces 12 and 22 convert the digital signals into ISDN D channel data, and vice versa. In the preferred embodiment, modems 14 and 20 are 9600 bps synchronous modems. It will be appreciated that other modem speeds can be used but, since the D channel data rate is 16 kbps, a lower speed modem would severely underutilize the data carrying capabilities of the D channel.

Figure 2:
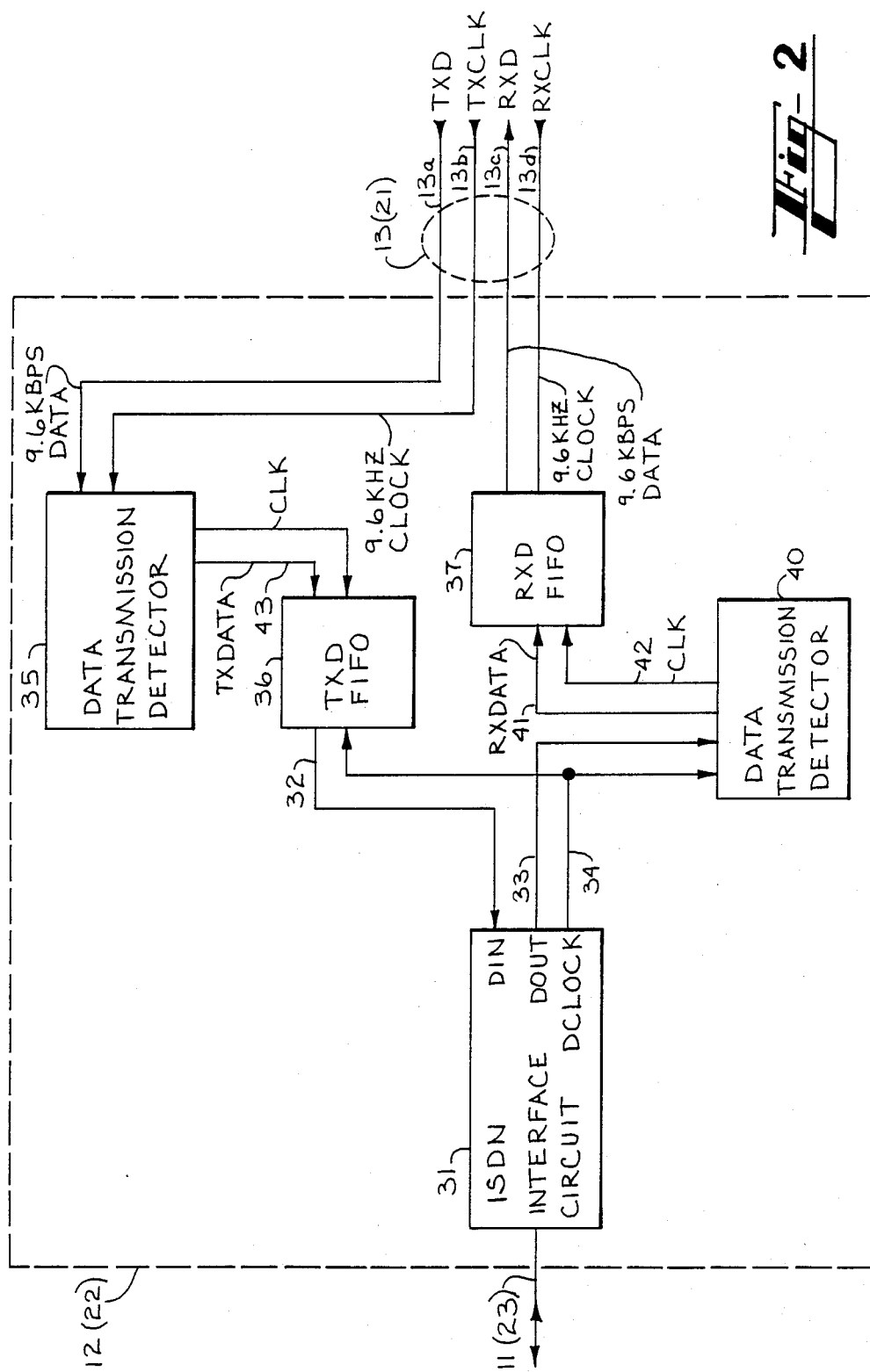
FIG. 2 is a block diagram of the TE or NT device shown in FIG. 1.

FIG. 2 is a block diagram of TE interface 12 or, as shown in the numerals in parenthesis, of NT interface 22. The general operation of interfaces 12 and 22 is identical and, therefore, only the operation of interface 12 will be described. The signal to be transmitted, coming from ISDN device 10 via ISDN bus 11 is provided to the ISDN interface circuit 31 which extracts the D channel data from the composite 192 kbps (2B+D) data signal. This circuit 31 also provides a 16 kbps clock signal for the D channel data. This data is passed to the data transmission detector circuit 40 which passes the data to the first-in first-out (FIFO) (37) at the 16 kbps rate. This is then fed to the modem from FIFO 37 according to the RXCLK clock provided by the modem on line 13c. The signal on line 13c is the received data which is provided to modem 14 for conversion into an analog signal for placing on analog line 15. Components 37 and 40 therefore perform the function of taking the 192 kbps (2B+D) ISDN signal from device 10, extracting the D channel data and clock, and providing the D channel data to the modem 14. Note that the D channel data is received from ISDN device 10 at the rate of 16 kbps but that this data is provided to modem 14 at the rate of 9.6 kbps or less. FIFO 37 provides a buffer between these two different data transfer speeds. FIFO 37 is prevented from overflowing by the packetizing of data and the use of flow control protocols between the TE device and the NT device which pass transparently through the modems and interface devices 12 and 22. The packetizing of data causes large non-data spaces to occur on the data line thereby greatly reducing the average data rate. The TE and NT devices do not buffer the non-data spaces so the FIFOs have time to empty while these non-data spaces are occurring.

Data coming from the modem on line 13a is fed to data transmission detector circuit 35 which then passes it to another FIFO 36. The data is then clocked out of FIFO 36 at the 16 kbps rate (derived from the ISDN interface circuit 31) into the ISDN interface circuit 31 and is then placed on ISDN bus 11 to ISDN device 10. FIFO 36 accumulates the data from modem 14 at the slower rate and provides the data (in complete packets only) at a 16 kbps data rate to the ISDN interface circuit 31. Data is not clocked out of FIFO 36 until a complete packet is available in FIFO 36. Therefore, there is no disruption of data in the middle of a packet.

Figure 3A:
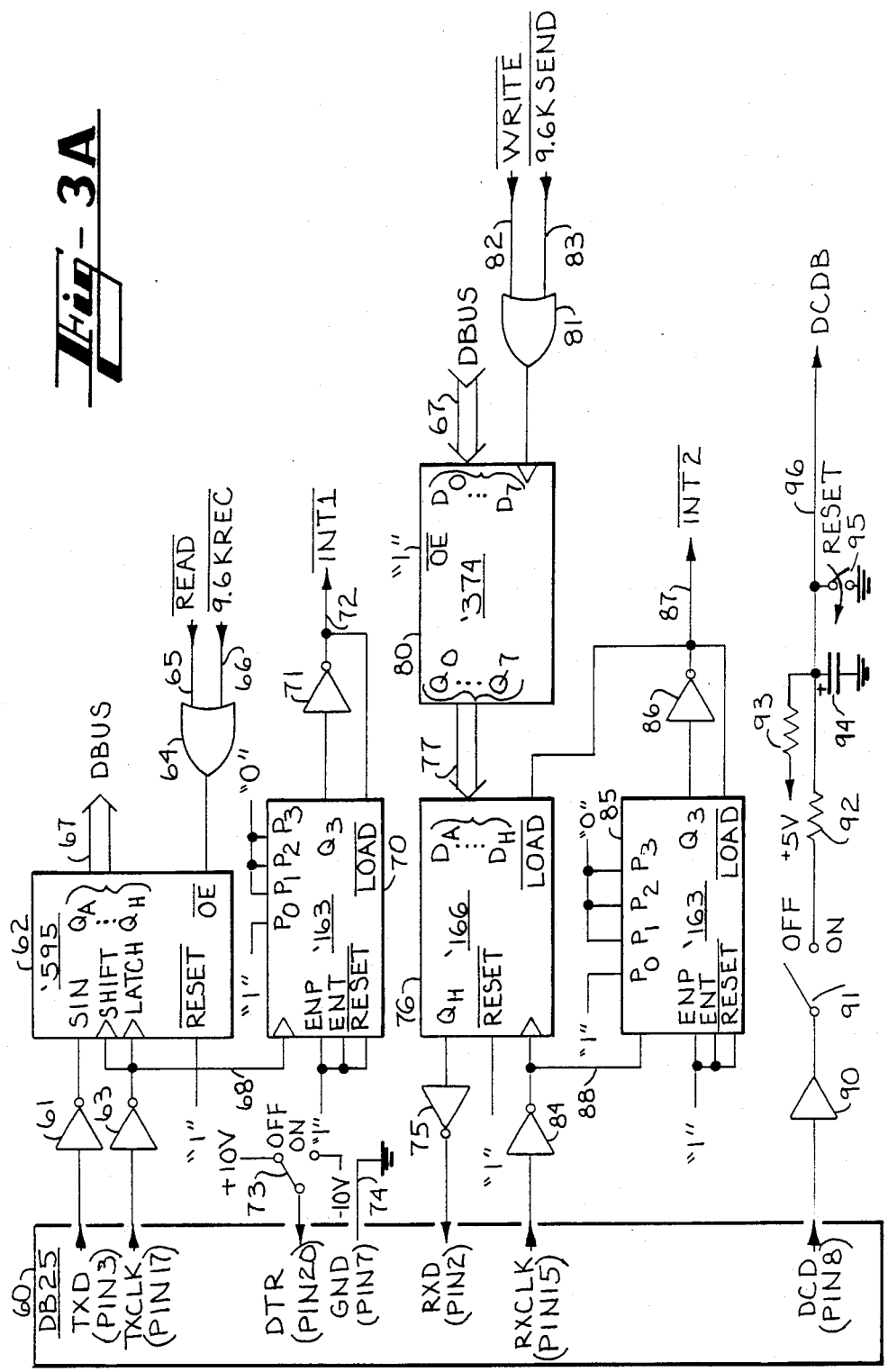

Turn now to FIGS. 3A through 3D, which are a schematic diagram of interface circuits 12 and 22. FIG. 3A is a schematic of the circuitry which interfaces with the modems 14 and 20. A DB-25 connector 60 is connected to the appropriate RS-232 lines 13 or 21. Transmit data (TXD) from the modem appears on pin 3, is inverted by RS232 receiver 61, and applied to the serial input (SIN) input of a serial input/parallel output register, such as the 74LS595. The parallel outputs, QA–QH of register 62 are connected to DBUS 67. Register 62 is clocked by the transmit data clock (TXCLK) on pin 17 of connector 60. Note that the TXCLK signal is inverted by RS232 receiver 63 before application to register 62 and counter 70. The negated READ signal on conductor 65 and the negated 9.6KREC signal on conductor 66 are applied to the inputs of a two input OR gate 64. The output of gate 64 is connected to the negated output enable input of register 62. The contents of register 62 are therefore placed onto DBUS 67 when the signals on both conductors 65 and 66 are a logic 0.

The negated TXCLK signal on conductor 68 is also applied to the clock input of a programmable binary counter, such as the 74HCT163. The preset inputs (P0–P3) of counter 70 cause counter 70 to begin counting at 0001. The Q3 output of register 70 is connected to the input of an inverter 71. The output of inverter 71 is connected by negated INT1 conductor 72 to the negated load input of register 70. After 8 TXD bits have been received, which corresponds to 8 positive going transitions of the negated TXCLK signal on conductor 68, the Q3 output of register 70 will become a logic 1. The output of inverter 71 will be a logic 0, which places counter 70 in the LOAD state and which generates an interrupt. The interrupt indicates that register 62 is full and its contents should be read. This causes the processor to place a low on conductors 65 and 66 which allows register 62 to place its contents on DBUS 67 so that the processor can read the incoming data.

The negated WRITE signal on conductor 82 and the negated 9.6KSEND signal on conductor 83 are connected to the inputs of a two input OR gate 81. The output of gate 81 is connected to the clock input of an 8 bit buffer 80, such as the 74HCT374. DBUS 67 is connected to the data inputs (D0–D7) of register 80. The outputs (Q0–Q7) of register 80 are connected by bus 77 to the data inputs (DA–DH) of a parallel in, serial out register, such as the 74HCT166. The QH output of register 76 is connected to the input of RS232 inverter/transmitter 75. The output of transmitter 75 is the RXD signal on pin 2 of connector 60. The receive data clock (RXCLK) on pin 15 is connected to the input of RS232 inverter/receiver 84. The output of receiver 84 is connected by conductor 88 to the clock input of register 76 and counter 85. Negative going transitions of the RXCLK signal on pin 15 cause the data contained in register 76 to be shifted out, in serial fashion, to the RXD pin. Counter 85, like counter 70, may be a type 74HCT163. The preset inputs (P0–P3) of counter 85 are also connected to load the value 0001. The Q3 output of counter 85 is connected to the input of inverter 86. The output of inverter 86 is the negated INT2 interrupt signal on conductor 87 and is connected to the negated load input of register 76 and of counter 85. Therefore, after 8 bits have been read from register 76 counter 85 causes register 76 to load the data appearing on the Q0–Q7 outputs of buffer 80. The negated INT2 signal on conductor 87 also signals the processor to write the next 8 bits of RXD data into buffer 80. Therefore, each time the 8 bits in register 76 have read out, register 76 is loaded with the next 8 bits of RXD data.

DTR pin 20 of connector 60 is selectably connected by switch 73 to plus 10 volts (off) or minus 10 volts (on). Switch 73 controls the data terminal ready (DTR) line of the modem 14 (20) and is used to switch from a telephone used for dialing (not shown) to the originating modem after the remote modem has answered the call. It is also used to signal an auto dialing modem to dial the far end modem for a more automated setup. The switch is generally used only from the originating end. At the answering end switch 73 is generally left in the off position.

Data carrier detect (DCD) pin 8 of connector 60 is connected to the input of RS232 receiver 90. The output of receiver 90 is connected to the buffered data carrier detect (DCDB) conductor 96 through switch 91 and a 56 ohm current limiting resistor 92. Conductor 96 is connected to the plus 5 volt supply through a 10K ohm pull-up resistor 93. Conductor 96 is connected to one end of a 10 microfarad capacitor 94. The other end of capacitor 94 is connected to circuit ground. Conductor 96 may also be selectably connected to ground via reset switch 95. Switch 91, when in the on position, allows the modem 14 (20) to use its DCD line to reset the interface 12 (22). This allows an interface to be remotely reset by simply dropping the carrier. Switch 91 is generally left in the on position so that a remote reset may be accomplished if necessary.

FIGS. 3B1 and 3B2 are a schematic diagram of the processor section of interfaces 12 and 22. In the preferred embodiment, microprocessor 150 is a type 80C188 microprocessor and memory 166 comprises both a type TC55257-12 RAM and a type 27C64 EPROM. The UCS and LCS output of processor 150 are connected by conductors 165 and 164, respectively, to the UCS and LCS inputs, respectively, of memory 166. In the preferred embodiment, the UCS signal selects the EPROM and the LCS signal selects the RAM. The negated read and negated write outputs of processor 150 are connected by conductors 65 and 82, respectively, to memory 166 and other circuits in FIG. 3. Processor 150 has an 8 bit combined address/data port (AD0–AD7) which is connected by ADBUS 157 to the A port (A0–A7) of bidirectional buffer 156 and to the D0–D7 inputs of address latch 161. In the preferred embodiment, buffer 156 is a type 74HCT245 and latch 161 is a type 74HCT373. The address latch enable (ALE) output of processor 150 is connected by conductor 160 to the negated latch input of latch 161. The Q0–Q7 outputs of latch 161 and the A8–A14 address outputs of processor 150 are connected by buses 162 and 163, respectively, to the address inputs of memory 166. The data input/output port of memory 166 is connected to DBUS 67 which is also connected to the B port (B0–B7) of bidirectional buffer 156. The data enable (DEN) output of processor 150 is connected by conductor 155 to the negated output enable input of buffer 156. The data transfer (DTRANS) output of processor 150 is connected by conductor 153 to one input of OR gate 154. The output of gate 154 is connected to the direction (DIR) input of buffer 156. Processor 150 provides several clock outputs (PCS0–PCS5) on conductors 110 (negated 16KSEND), 140 (negated 16KREC), 83 (negated 16KSEND), 66 (negated 16KREC), and 152 (negated DECCS), respectively. Also, the PCS4 clock is connected by conductor 152 to a negated input of gate 154. It will be appreciated that address latch 161 and bidirectional buffer 156 are used in a conventional manner to compensate for the combined address/data characteristics of the AD0–AD7 inputs/outputs of processor 150.

The DCDB signal on conductor 96 is connected to the negated reset input of processor 150 and, via switch 95, or via switch 91 and the DCD input on connector 60, can be used to reset processor 150. Processor 150 has four interrupts (INT0–INT3). The INT1 input is used to interrupt processor 150 when the TXD data has filled register 62 (FIG. 3A). Likewise, the INT2 input is used to interrupt processor 150 whenever all the RXD data has been read out of register 76 (FIG. 3A). The INT0 input is used to interrupt processor 150 every time 8 bits have been transmitted or received on the ISDN D channel. The DECINT signal on conductor 144 is connected to the input of inverter 146. Conductor 144 is also connected to the +5 volt supply through a 10K pullup resistor 145. The output of inverter 146 is connected by conductor 147 to the INT3 input of processor 150. The INT3 input is used to notify processor 150 that the DEC (FIG. 3C) requires servicing. Processor 150 is programmed to detect a rising edge on interrupt inputs INT0-INT2, and a logic 1 on interrupt INT3.

Data to be placed upon the ISDN D channel is placed on DBUS 67 by processor 150. Processor 150 then causes the negated WRITE and negated 16KSEND signals to go low. The negated WRITE and negated 16KSEND signals on conductors 82 and 110, respectively, are connected to the inputs of OR gate 111. The output of gate 111 is connected to the clock input of a type 74HCT374 octal buffer 112. DBUS 67 is connected to the data inputs (D0-D7) of buffer 112. The outputs (Q0-Q7) of buffer 112 are connected by bus 113 to the data inputs (DA-DH) of a type 74HCT166 parallel in/serial out register 114. The output QH of register 114 is connected by conductor 115 to one input of a two input OR gate 116. The output of gate 116 is connected to one input of a two input AND gate 122. The output of gate 122 is the SSDI signal on conductor 123. Signal DGATE on conductor 117 is connected to the other input of OR gate 116 and is also connected to circuit ground through a 1K pulldown resistor 121. Signal SDIGATE on conductor 120 is connected to the other input of AND gate 122 and to +5 volts through a 10K pullup resistor 124. The purpose of the pullup and pulldown resistors is explained below.

Conductor 126 is connected to the input of inverter 127 and the clock inputs of a type 74HCT163 presettable counter 135 and a type 74HCT595 serial in/parallel out register 142. The preset inputs of counter 135 are set to load counter 135 with the initial value 0001. The Q3 output of counter 135 is connected to the input of inverter 136. The output of inverter 136 is connected by negated INT0 conductor 137 to the negated load input of counter 135 and the negated load input of register 114. The operation of counter 135 is similar to that of counters 70 and 85 of FIG. 3A. That is, after eight transitions of the clock signal on conductor 126, which indicates that the data in register 114 has been shifted out, counter 135 will generate an interrupt which causes processor 150 to load additional data into buffer 112. The signal on conductor 137 also causes register 114 to load the data present at the output of register 112 on bus 113. Note that an interrupt occurs every 8 bits.

The negated 16KREC signal on conductor 140 and the negated READ signal on conductor 65 are connected to the inputs of two input OR gate 141. The output of gate 141 is connected to the negated output enable input of register 142. The SSDO signal on conductor 143 is connected to the serial input (SIN) of register 142. The outputs (QA-QH) of register 142 are connected to DBUS 67. Data which has been received on the D channel is provided by conductor 143 to the serial input of register 142 and this data is shifted into register 142 by the clock on conductor 126. Note that the clock on conductor 126 simultaneously controls the shifting of registers 114 and 142 and the incrementing of the count in counter 135. Counter 135 causes an interrupt to be generated and causes registers 112 and 142 to be serviced every 8 bits (clock transitions on conductor 126). When the interrupt is generated, processor 150, in addition to causing data to be loaded into register 112, causes conductors 65 and 140 to go low, thereby allowing register 142 to place its contents on DBUS 67 so that processor 150 may read the incoming D channel data.

The clock signal on conductor 126 may come from either one of two sources. One source is the 16KHZCLK signal on conductor 125. This signal is used when the interface is operated as an "NT" type ISDN device. The other clock source is the output of AND gate 131 on conductor 132. The PCLK signal on conductor 130 is connected to one input of gate 131. The negated TSCB signal on conductor 133 is connected to the input of inverter 134. The output of inverter 134 is connected to the other input of gate 131. The output of gate 131 is used whenever the interface device is used as a "TE" type ISDN device. For clarity, selection of either the clock signal on conductor 125 or the clock signal on conductor 132 is shown as being accomplished by means of switch 128.

However, in the preferred embodiment conductors 125, 126 and 132 are connected together and a switch 128 is not used but, instead, if the NT mode is desired, gate 131 is physically removed from the circuit board and, if TE operation is desired, the device generating the 16KHZCLK clock signal on conductor 125 is physically removed from the circuit board. The purpose of constructing the preferred embodiment of the present invention in this manner is so that a single device can be used as either a TE device or a NT device by simply inserting or removing certain integrated circuit packages from the circuit board. Of course, it will be appreciated that selection of NT or TE operation can also be accomplished by a multi-pole, doublethrow switch, part of which is shown as switch 128. Another option is to use a switch and gates to selectively enable or disable selected outputs. When configured to operate in the TE mode, the devices which generate the signals on SDIGATE conductor 120 and DGATE conductor 117 will not be present. Therefore, resistors 121 and 124 properly bias gates 116 and 123, respectively, for normal operation. Similarly, if the device is configured for NT mode operation then the device which generates the DECINT signal on conductor 144 will be missing. Therefore, resistor 145 causes inverter 146 to place a logic 0 onto conductor 147 so that the INT3 input of processor 150 does not cause an unnecessary interrupt.

The X1 and X2 clock terminals of processor 150 are connected by conductors 170 and 171 to a 16 MHz crystal 170 and to a series combination of 10 picofarad capacitors 172 and 173. The junction of capacitors 172 and 173 is connected to circuit ground.

Turn now to FIG. 3C which is a schematic diagram of the additional circuitry used when an interface is configured for the TE mode of operation. This circuitry is not used when the interface is configured for the NT mode of operation. An ISDN line 11 is connected to RJ-45 8 pin connector 180. The negative TXD line (pin 4) is connected by conductor 181 to one end of line balancing resistor 183 and one end of a first winding of isolation transformer 184. The positive TXD line (pin 5) is connected by conductor 182 to the other end of resistor 183 and the other end of the first winding of transformer 184. The second winding of transformer 184 is connected by conductors 185 and 186 to the LOUT1 and LOUT2 outputs, respectively, of an Advanced Micro Devices type 79C31A Digital Exchange Controller (DEC) 187. Other ISDN interface devices from other manufactures could also be used. DEC 187 causes an ISDN signal to be placed onto conductors 181 and 182 via transformer 184.

The negative receive data line (pin 3) is connected by conductor 190 to one end of line balancing resistor 192 and one end of the first winding of isolation transformer 193. The positive receive data line (pin 6) is connected by conductor 191 to the other end of resistor 192 and the other end of the first winding of transformer 193. The second winding of transformer 193 is connected by conductors 194 and 195 to the LIN1 and LIN2 inputs, respectively, of DEC 187. DEC 187 therefore receives the ISDN signal present on conductors 190 and 191. DEC 187 accepts the serial data input (SSDI) on conductor 123 via its DRB input, configures this data into the ISDN format and places the resulting ISDN signal on its LOUT1 and LOUT2 outputs. When receiving data via its LIN1 and LIN2 inputs DEC 187 will extract the D channel data from the ISDN signal and provide, via its DXB output, the D channel data onto SSDO conductor 143. Conductor 143 is also connected to the +5 volt supply through a 10k ohm pullup resistor 206.

The negated interrupt output of DEC 187 is connected to DECINT conductor 144. A low on conductor 144 informs processor 150 that DEC 187 requires servicing. ADBUS 157 is connected to the address/data input/output port (AD0-AD7) of DEC 187. This allows processor 150 to program DEC 187 and exchange information with DEC 187 other than through the D channel terminals (DRB and DXB). ALE conductor 160 is connected to the address latch enable input of DEC 187 for latching in the address of the register for which data is to be transferred. The negated READ signal on conductor 65 is connected to one input of a two input AND gate 196. The output of gate 196 is connected by conductor 197 to the negated READ input of DEC 187. DCDB conductor 96 is connected to the other input of gate 196 and to one input of a two input AND gate 200. The output of gate 200 is connected by conductor 201 to the negated WRITE input of DEC 187. Negated WRITE conductor 82 is connected to the other input of gate 200. The negated READ and WRITE signals allow processor 150 to write data to or read data from DEC 187. Note that when the DCDB signal on conductor 96 is low, such as during a reset, both the read and write inputs of DEC 187 are brought low which causes a hard reset to DEC 187. The negated DECCS signal on conductor 152 is connected to the negated chip select (CS) input of DEC 187 and is used to select DEC 187 for read or write operations. The negated TSCB (time slot control) output of DEC 187 is connected to conductor 133. Conductor 133 is also connected to the +5 volt supply through a 10K ohm pullup resistor 205. The negated TSCB signal is used in conjunction with the PLCK signal on conductor 130 to generate the clock signal on conductor 126 used for clocking data into and out of registers 114 and 142 (FIG. 3B). The negated TSCB signal is low when data is present on the DXB output of DEC 187.

Clock generator 202 generates the clocks necessary for the operation of DEC 187. Three clocks are provided. A 12.288 MHz clock on conductor 203, which is connected to the MCLK input of DEC 187. A 1.024 MHz clock on PLCK conductor 130, which is connected to the PCLK input of DEC 187. The framing clock (FC) on conductor 204 is connected to the FS (frame synchronization) input of DEC 187. The FC clock on conductor 204 is a 1.95 microsecond pulse repeated at 8 kbps.

Figure 3D:
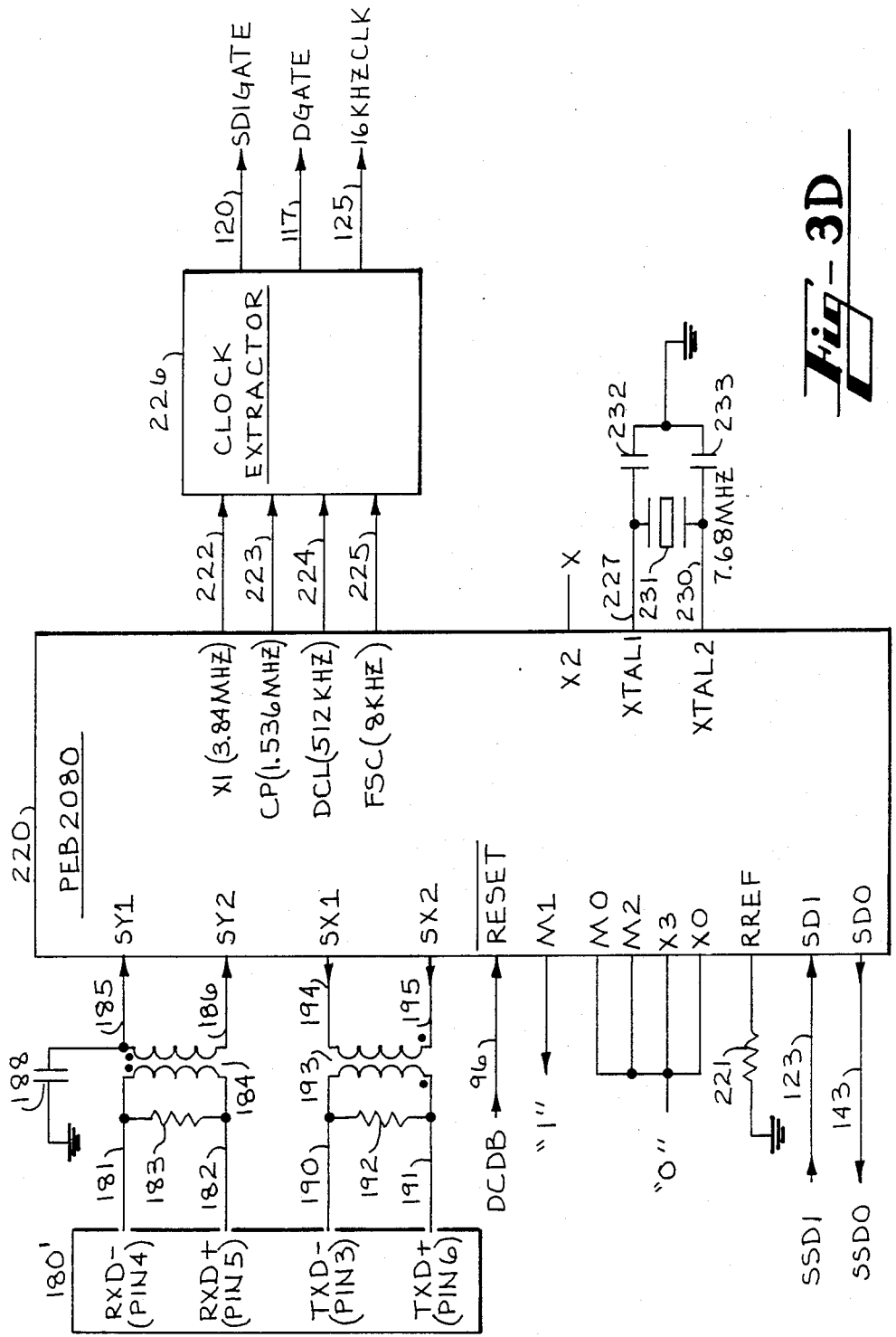
Figure 4C:
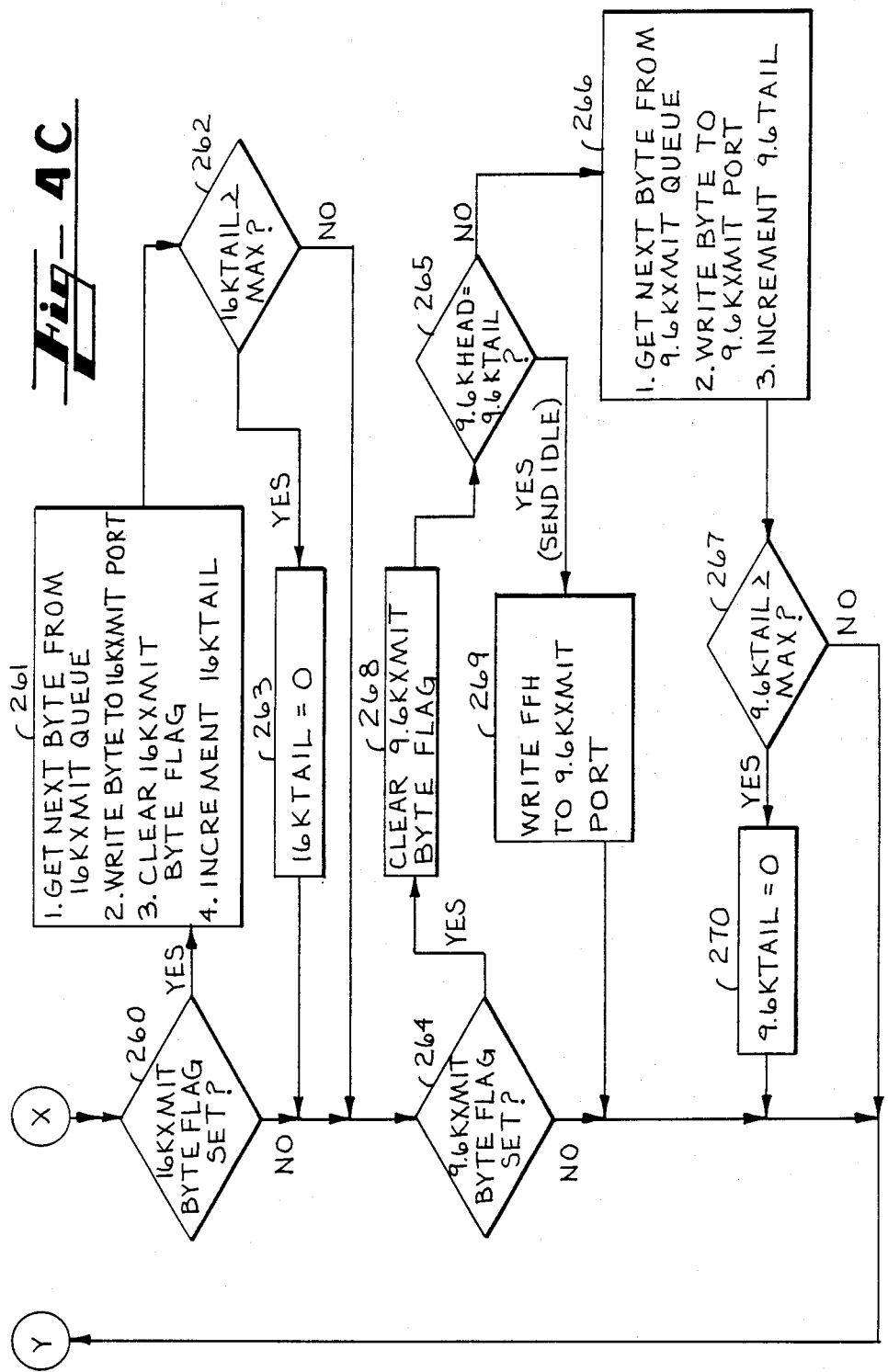
Figure 4D:
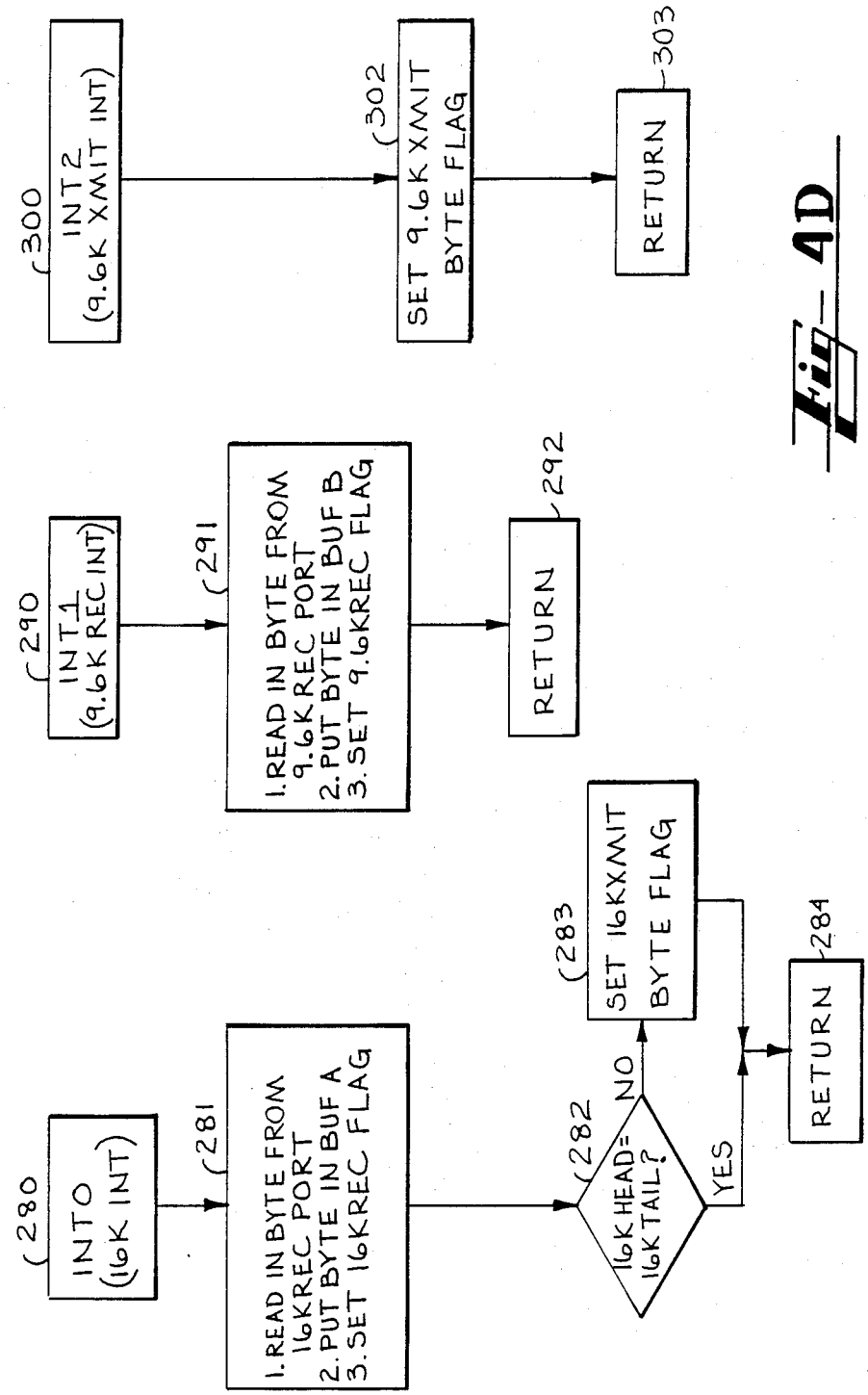

Turn now to FIG. 3D which is a schematic diagram of the additional circuitry used when an interface is configured for the NT mode of operation. This circuitry is not used when the interface is configured for the TE mode of operation. An 8 pin RJ45 telephone connector 180' provides the connection to ISDN line 23 (FIG. 1). In the preferred embodiment, two connectors 180 and 180' are used and are labeled as the TE connection and the NT connection, respectively. Two connectors were used as a matter of convenience. However, since connectors 180 and 180' are connected in parallel a single connector 180 could be used if desired. On connector 180', pin 4 and pin 5 are the negative RXD and positive RXD signal points, respectively. Likewise, pin 3 and pin 6 are the negative TXD and positive TXD signal points, respectively. Pin 4, pin 5, pin 3 and pin 6 of connector 180' are connected to conductors 181, 182, 190, and 191, respectively. The connection of resistors 183 and 192 and transformers 184 and 193 has been previously described in conjunction with FIG. 3C. Conductors 185 and 186 are connected to the SY1 and SY2 inputs of an S BUS interface circuit, such as the Siemens PEB2080. ISDN interface from other manufacturers could also be used. The Siemens PEB2080 requires that a 0.01 microfarad capacitor 188 be connected between the SY1 input and circuit ground. The device 220 is configured to perform as an NT type device. The SY1 and SY2 terminals of device 220 are the ISDN signal inputs for device 220. Conductors 194 and 195 are connected to the SX1 and SX2 outputs of device 220. Outputs SX1 and SX2 are the ISDN signal outputs of device 220. Referring briefly to FIG. 3C, it will be seen that a TE interface transmits on pins 4 and 5 and receives on pins on 3 and 6 of connector 180. An NT interface transmits on pins 3 and 6 and receives on pins 4 and 5.

DCDB conductor 96 is connected to the negated reset input of device 220. The RREF input of device 220 is connected to circuit ground through a 2.2k ohm, 1 percent resistor 221. The outgoing serial data on SSDI conductor 123 is connected to the SDI input of device 220. Device 220 then places this data, in ISDN format, onto conductors 194 and 195 via its SX1 and SX2 outputs. Likewise, incoming ISDN data, received via the SY1 and SY2 inputs of device 220, is placed on SSDO conductor 143 by device 220 via its SDO output.

The XTAL1 and XTAL2 terminals of device 220 are connected by conductors 227 and 230 to a 7.68 MHz crystal 231 and to the series combination of two 10 picofarad capacitors 232 and 233. The junction of capacitors 232 and 233 is connected to circuit ground.

Device 220 provides four clock outputs, 3.84 MHz, 1.536 MHz, 512 kHz, and 8 kHz on conductors 222, 223, 224 and 225, respectively, to clock extractor circuit 226. Clock extractor circuit 226 generates the SDIGATE signal on conductor 120, the DGATE signal on conductor 117, and the 16KHZCLK signal on conductor 125. The SDIGATE signal is an approximately 11.72 microsecond logic 0 pulse which is delayed about 39.2 microseconds from the rising edge of the 8 kHz clock on conductor 225. The DGATE signal on conductor 117 is an approximately 7.81 microsecond logic 0 pulse which is delayed about 27.5 microseconds from the rising edge of the 8 kHz clock on conductor 225. The 16KHZCLK signal on conductor 25 comprises two 3.9 microsecond logic 0 pulses which begin approximately 0.33 microseconds after the falling edge of the DGATE signal. The two logic 0 pulses are separated by a logic 1 pulse having a width of approximately 3.9 microseconds. As was discussed with respect to FIG. 3B, the SDIGATE and DGATE signals are used to enable gating of data into the SDI input of device 220 via SSDI conductor 123. The 16KHZCLK signal on conductor 125 is used for the actual shifting of the data into device 220 and also serves to increment a counter 135 which generates an interrupt to processor 150 each time that 8 bits have been transferred to or from the ISDN D channel.

Device 220 and clock extractor 226 are only used when the device is configured to act as a NT interface. Therefore, when the device is configured to act as a TE interface the integrated circuits for device 220 and clock extractor 226 are physically removed from the board. Alternatively, if desired, a multi-pole double throw switch and/or logic gating could be used to selectively enable or disable certain integrated circuits so that selection of the NT or TE mode could be accomplished by a switch rather than by physically inserting or removing integrated circuits.

Turn now to FIGS. 4A through 4D which are a flow chart of the operation of processor 150. After being initialized 240 processor 150 determines 241 whether the 16KREC flag has been set. If not, processor 150 proceeds to decision 247. If so, then processor 150 reads 242 the byte from BUFA. BUFA is a designated portion of the RAM in memory 166 used to temporarily store data incoming on the ISDN line. Processor 150 then determines 243 whether the byte contains one or more zeros (i.e., contains data). If not, then this byte corresponds to an idle line and is deleted (i.e., not placed in the 16KXMIT queue and not sent to the modem); processor 150 proceeds to decision 247. If so, then the byte contains data so processor 150 then 244 places the byte in the 9.6KXMIT queue and increments the 9.6KHEAD counter. Processor 150 then determines 245 whether the 9.6KHEAD count is at its maximum allowed value. In the preferred embodiment, the maximum count is 8192. If not, processor 150 proceeds to decision 247. If so, then processor 150 sets the HEAD value to the beginning of the buffer and then proceeds to decision 247. In other words, the 9.6KXMIT queue and its associated pointer (contained in the 9.6KHEAD counter) form a circular queue that is being used as a software FIFO (37).

In decision 247 processor 150 determines whether the 9.6KREC flag has been set. If not, processor 150 proceeds to decision 260 (FIG. 4B). If so, then processor 150 reads 250 the byte from BUFB. BUFB corresponds to a section in the memory 166 used to temporarily store data received from the modem on the RS-232 line. Processor 150 then determines 251 whether the byte contains data (one or more zeros). If the byte does not contain data (byte equals FFh), processor 150 determines 252 whether the RECEIVE ZERO (RECZ) flag has been set. If not, processor 150 proceeds to decision 260. If so, then in step 253 processor 150 clears the RECEIVE ZERO flag, stores 5 bytes of FFh in the 16KXMIT queue in order to separate the packets in the FIFO, adds 4 to the WORKINGHEAD pointer, and sets the 16KHEAD pointer equal to the WORKINGHEAD pointer. Processor 150 then increments the WORKINGHEAD pointer. Processor 150 then compares 257 WORKINGHEAD to its maximum allowed value. If less, processor 150 proceeds to decision 260. If equal, processor 150 sets 259 WORKINGHEAD to its minimum value and then proceeds to decision 260. If greater, processor 150 sets 258 the WORKINGHEAD pointer and the 16KHEAD pointer to their rollaround values by substracting their MAX values. Processor 150 then proceeds to decision 260.

If, at decision 251, the byte contains data (one or more zeros), processor 150 then 254 places the byte in the 16KXMIT queue, sets the RECEIVE ZERO flag, and increments the WORKINGHEAD. Processor 150 then determines 255 whether the WORKINGHEAD is at its maximum allowed value. If not, processor 150 proceeds to decision 260. If so, then processor 150 sets the WORKINGHEAD pointer to its minimum value. In the preferred embodiment, the maximum allowed value for the WORKINGHEAD is 8192. The WORKINGHEAD pointer and the 16KXMIT queue form a circular queue being used as a software FIFO (36).

In decision 260 processor 150 determines whether the 16KXMITBYTE flag has been set. If not, processor 150 proceeds to decision 264. If so, processor 150 then 261 gets the byte from the 16 KXMIT queue, writes the byte to register 112 of FIG. 3B (the 16KXMIT port), clears the 16KXMITBYTE flag, and increments the 16KTAIL counter. Processor 150 then determines 262 whether 16KTAIL counter is at its maximum allowed value. If not, processor 150 proceeds to decision 264. If so, then processor 150 sets the 16KTAIL counter to its starting value. In the preferred embodiment, the maximum allowed value of 16KTAIL is 8192.

In decision 264 processor 150 determines whether the 9.6KXMITBYTE flag has been set. If not, processor 150 returns to decision 241. If so, then processor 150 determines 265 whether the 9.6KHEAD count is equal to the 9.6KTAIL count. If so, then processor 150 writes the value FFh to the 9.6KXMIT port and again returns to decision 241. If not processor 150 then 266 writes the byte to register 80 of FIG. 3A (the 9.6KXMIT port). And increments the 9.6KTAIL count. Processor 150 then determines whether the 9.6KTAIL count is at its maximum allowed value. If not, processor 150 returns to decision 241. If not, then processor 150 sets the 9.6KTAIL counter to its starting value. In the preferred embodiment, the maximum allowed value for the 9.6KTAIL count is 8192.

If an INT0 interrupt occurs 280 then processor 150 will 281 read in the byte from register 142 (the 16KREC port), put the byte in BUFA, and set the 16KREC flag. Processor 150 then determines 282 whether 16KHEAD is equal to 16KTAIL. If not, processor 150 returns 284. If so, processor 150 then sets 283 the 16KXMITBYTE flag and then returns 284.

When an INT1 interrupt occurs 290, processor 150 then 291 reads in the byte from register 62 of FIG. 3A, (the 9.6KREC port) places the byte in BUFB, and sets the 9.6KREC flag. Processor 150 then returns 292.

When an INT2 interrupt occurs 300, processor 150 sets 302 the 9.6KXMITBYTE flag and returns 303.

When an INT3 interrupt occurs (not shown), processor 150 reads the status register in the DEC to determine the state of the ISDN interface (i.e., active or not active) and reports this to the user via an LED (not shown). The handling of an INT3 interrupt is conventional and is not concerned with the transfer of data.

Briefly summarized, INT0 is concerned with reading and writing ISDN data. INT1 is concerned with reading the data received from the modem. INT2 is concerned with writing the data to the modem. Steps 241 through 246 are concerned with detecting data on the ISDN line and placing it in the FIFO (37) and with deleting idle signals received from the ISDN device. Steps 247 through 259 are concerned with detecting data from the modem and placing it in the FIFO (36) and with inserting idle signals into the data stream to the ISDN device. Steps 260–263 are concerned with reading the data from the FIFO (36) and placing the data onto the ISDN line. Steps 264 through 270 are concerned with reading the data from the FIFO (37) and writing data out onto the RS-232 line.

The preferred embodiment of the present invention discloses an ISDN/RS-232 interface device which can be selectably configured to operate in either the TE or the NT mode. The present invention allows the development and testing of hardware and/or software for devices which are intended to be ISDN compatible by allowing communication with an ISDN telephone switching system or network by using analog telephone lines. The present invention also allows communication between ISDN devices over a standard analog telephone network so that ISDN devices can be used even in areas where the local telephone company does not provide ISDN facilities. Although the preferred embodiment of the present invention has been described with particularity, it will be understood that numerous modifications and variations are possible. For example, the present invention may also be implemented using only hardware instead of a combination of hardware and software. Also, the present invention is not limited to communications on the D channel but could also transfer data on a B channel. Accordingly, the scope of the present invention is to be limited only by the claims below.

We claim:

1. An apparatus for allowing a first ISDN device to communicate with a second ISDN over an analog telephone line, comprising:
   first interface means connected to said first ISDN device, said first interface means comprising means for receiving ISDN data signals from said first ISDN device, and means for separating selected data for a selected ISDN channel from said ISDN data;
   first means for determining whether said selected data for said selected ISDN channel represents a data condition or an idle signal condition;
   means for deleting said selected data which represents said idle signal condition;
   a first modem for receiving said selected data and placing a modulated signal onto said analog telephone line, said modulated signal corresponding to said selected data;
   a second modem for receiving said modulated signal from said analog telephone line, and demodulating said modulated signal to provide demodulated data corresponding to said modulated signal;
   second means for determining whether said demodulated data represents a data condition or an idle signal condition;
   means for inserting a predetermined number of bytes of a predetermined value into said demodulated data if said demodulated data represents said idle signal condition;
   means for assembling said demodulated data into packets having a predetermined size; and
   second interface means, said second interface means comprising means for receiving said packets, means for incorporating said packets into a selected ISDN channel of an ISDN data stream, and means for providing said ISDN data stream to said second ISDN device.

2. The apparatus of claim 1 wherein said first modem comprises a synchronous modem.

3. The apparatus of claim 1 wherein said second modem comprises a synchronous modem.

4. The apparatus of claim 1 wherein said ISDN data represents two B channels and a D channel and said selected ISDN channel is said D channel.

5. The apparatus of claim 1 wherein said second modem provides an indication of an absence of a carrier signal from said first modem, and further comprising means for resetting said second interface means in response to said second modem providing said indication of said absence of said carrier signal.

6. The apparatus of claim 5 and further comprising means for disabling said means for resetting.

7. The apparatus of claim 1 wherein said first means for determining comprises means for evaluating whether a byte of said selected data for said selected ISDN channel contains at least one logic 0.

8. The apparatus of claim 1 wherein said second means for determining comprises means for evaluating whether a byte of said demodulated data contains at least one logic 0.

9. The apparatus of claim 1 and further comprising means for selectably configuring said first interface means to function as a terminal equipment (TE) device or as a network termination (NT) device.

10. The apparatus of claim 9 wherein:
    said first interface means comprises first circuitry for performing TE device functions and second circuitry for performing NT device functions;
    said first circuitry comprises a first integrated circuit removably inserted into a first socket;
    said second circuitry comprises a second integrated circuit removably inserted into a second socket; and
    said first interface means is configured to function as a said TE device by removing said second integrated circuit, and is configured to function as an NT device by removing said first integrated circuit.

11. The apparatus of claim 1 and further comprising means for selectably configuring said second interface means to function as a terminal equipment (TE) device or as a network termination (NT) device.

12. The apparatus of claim 11 wherein:
    said second interface means comprises first circuitry for performing TE device functions and second circuitry for performing NT device functions;
    said first circuitry comprises a first integrated circuit removably inserted into a first socket;
    said second circuitry comprises a second integrated circuit removably inserted into a second socket; and
    said second interface means is configured to function as a said TE device by removing said second integrated circuit, and is configured to function as an NT device by removing said first integrated circuit.

13. A method for allowing a first ISDN device to communicate with a second ISDN device over an analog telephone line, comprising the steps of:
    receiving ISDN data signals from said first ISDN device;

separating selected data for a selected ISDN channel from said ISDN data;
determining whether said selected data for said selected ISDN channel represents a data condition or an idle signal condition;
deleting said selected data which represents said idle signal condition;
placing a modulated signal onto said analog telephone line, said modulated signal corresponding to said selected data;
receiving said modulated signal from said analog telephone line;
demodulating said modulated signal to provide demodulated data corresponding to said modulated signal;
determining whether said demodulated data represents a data condition or an idle signal condition;
inserting a predetermined number of bytes of a predetermined value into said demodulated data if said demodulated data represents said idle signal condition;
assembling said demodulated data into packets having a predetermined size;
incorporating said packets into a selected ISDN channel of an ISDN data stream; and
providing said ISDN data stream to said second ISDN device.

14. The method of claim 13 wherein said step of determining whether said selected data represents a data condition or an idle signal condition comprises evaluating whether a byte of said selected data contains at least one logic 0.

15. The method of claim 13 wherein said step of determining whether said demodulated data represents a data condition or an idle signal condition comprises evaluating whether a byte of said demodulated data contains at least one logic 0.

16. The method of claim 13 and further comprising the step of:
installing a first integrated circuit into a first socket if said first ISDN device is a network termination (NT) device; and
inserting a second integrated circuit into a second socket if said first ISDN device is a terminal equipment (TE) device.

17. The method of claim 13 and further comprising the step of:
installing a first integrated circuit into a first socket if said second ISDN device is a network termination (NT) device; and
inserting a second integrated circuit into a second socket if said second ISDN device is terminal equipment (TE) device.

* * * * *